United States Patent [19]
Engdahl et al.

[11] 3,928,209
[45] Dec. 23, 1975

[54] LAMINATED SETTLER

[75] Inventors: Holger Gustaf Engdahl; Raimo Johannes Parviainen, both of Savonlinna, Finland

[73] Assignee: Enso-Gutzeit Osakeyhtio, Helsinki, Finland

[22] Filed: Sept. 3, 1974

[21] Appl. No.: 502,499

[52] U.S. Cl. ............................. 210/519; 210/522
[51] Int. Cl.² ........................................ B01D 21/00
[58] Field of Search .......... 210/513, 515, 519, 521, 210/522

[56] References Cited
UNITED STATES PATENTS

| | | | |
|---|---|---|---|
| 1,190,863 | 7/1916 | Come et al. | 210/521 X |
| 3,385,439 | 5/1968 | Bach | 210/522 X |
| 3,613,889 | 10/1971 | Reed | 210/522 |
| 3,706,384 | 12/1972 | Weigman-Hane | 210/519 |
| 3,768,648 | 10/1973 | Anderson et al. | 210/522 |
| 3,837,501 | 9/1974 | Pielkenrood | 210/522 |

*Primary Examiner*—Theodore A. Granger
*Attorney, Agent, or Firm*—Lewis H. Eslinger; Alvin Sinderbrand

[57] ABSTRACT

A laminated settler for settling solids present in a liquid in a tank, in which the liquid to be settled is fed into compartments defined between a plurality of laminae slanted in relation to the vertical and consisting of laterally slanted and unslanted surfaces, in which settler the liquid to be settled flows upwards, sediment settles therefrom under the effect of gravity onto the slanted surfaces and further flows onto the unslanted surfaces of the laminae, said settler having a feeding groove at the lower end of the laminae and open only to said compartments, which feeding groove extends only over part of the width of said slanted surfaces, collecting troughs at the upper end of the laminae for receiving liquid coming through the compartments and from which the sediment has been settled, and a sediment funnel under said compartments for receiving the separated sediment, said sediment funnel extending under the unslanted surfaces of the laminae and thus laterally beyond the feeding groove. Preferably, the width of the upper surface of the feeding groove opening to the compartments is from 20 to 80 per cent of the width of the laminae.

4 Claims, 4 Drawing Figures

LAMINATED SETTLER

BACKGROUND OF THE INVENTION

1. Field of the Invention

The present invention relates to a laminated settler which is used in the purification of raw water and waste water, and in which the solid materials present in the water are separated by sedimentation.

More specifically, the present invention relates to the type of settlers having a plurality of laminae slanted in relation to the vertical and along which the liquid containing solid particles to be settled is forced to flow upwards.

2. Description of the Prior Art

Previously known are devices in which the suspension to be settled is fed between slanted laminae. When the suspension flows upwards, solids settle from the liquid, under the effect of gravity, as a sediment on the laminae, and the sediment flows downwards along the surfaces of the laminae, finally falling into the sediment funnel from the lower edge of the lamina. The purified liquid from which solids have thus been separated is removed from the upper edges of the laminae.

Such a settler has been introduced, for example, in Swedish Pat. No. 199,310. Therein the suspension to be settled is fed through a feed inlet at the lower end of the laminae, and the sediment settling on the laminae is removed into an outlet which is separated from the feed inlet by a partition and extends below the feed inlet. This is to keep the feed suspension and the settled sediment separate from each other. This does take place at the very lowest part of the laminae. There is a structural disadvantage in that in the said device, each compartment formed by the laminae requires a separate feed inlet and outlet with a partition wall in between, which makes the laminated structure complicated. Finnish Pat. application No. 2179/70 also introduces a laminated settler in which the object is to prevent the suspension flow and the sediment flow from intersecting. For this purpose there are division boxes as feeding devices outside the outer edges of the laminae. The boxes have openings into each compartment formed by the laminae. In this case the horizontal flow in the division box must be changed into a vertical one between the laminae. Thereby turbulences are created at least in the lower parts of the laminae and a certain disturbance is created in the vertical flow, a phenomenon which disturbs the separation of the sediment in the laminar flow.

In French Pat. No. 1,098,155, again, the laminae used are perforated corrugated plates or narrow bars with possibly an arching cross section which have been fitted at some distance from each other so that slits are formed between them. When using such laminae, it is completely impossible to achieve a laminar flow, and therefore the immediate requirement for settling very light particles, such as flakes, are absent. Besides, the flow is mainly vertical.

SUMMARY OF THE INVENTION

The present invention provides a settler of the character once described, which comprises a plurality of laminae having slanted and unslanted surface portions and defining compartments, slanted in relation to the vertical, along which the liquid to be settled flows, a feeding groove open only to said compartments and having its upper edge at the same level as the lower edge of the laminae, said feeding groove extending over part of the width of the slanted surfaces of the laminae, collecting troughs at the upper ends of the laminae for receiving liquid, from which the sediment has been removed, as an overflow from the compartments; and sediment funnel constituting the floor of the settler and receiving sediment separated from the liquid, said sediment funnel extending laterally further than said feeding groove.

The settler according to this invention overcomes the disadvantages relating to the known devices described above.

Already the fact that a laminated settler according to the invention has a feeding groove or feeding grooves over only part of the settling compartment width, prevents the sediment flow into the feeding groove from the lower edge of the compartments. Since, furthermore, each lamina has one or several bends substantially of the same length as the lamina, the sediment is directed along the slanting surfaces of the laminae beyond the feeding groove and cannot become mixed with the suspension to be settled. Furthermore, such a lamina provided with a bend is stiffer than the straight lamina used in the previously known devices. In the previously known devices it is therefore necessary to use thick plates when large lamina surfaces are desired, which results in expensive constructions when corrosion-resistant materials must be used.

DESCRIPTION OF THE PREFERRED EMBODIMENTS

Figure 1:
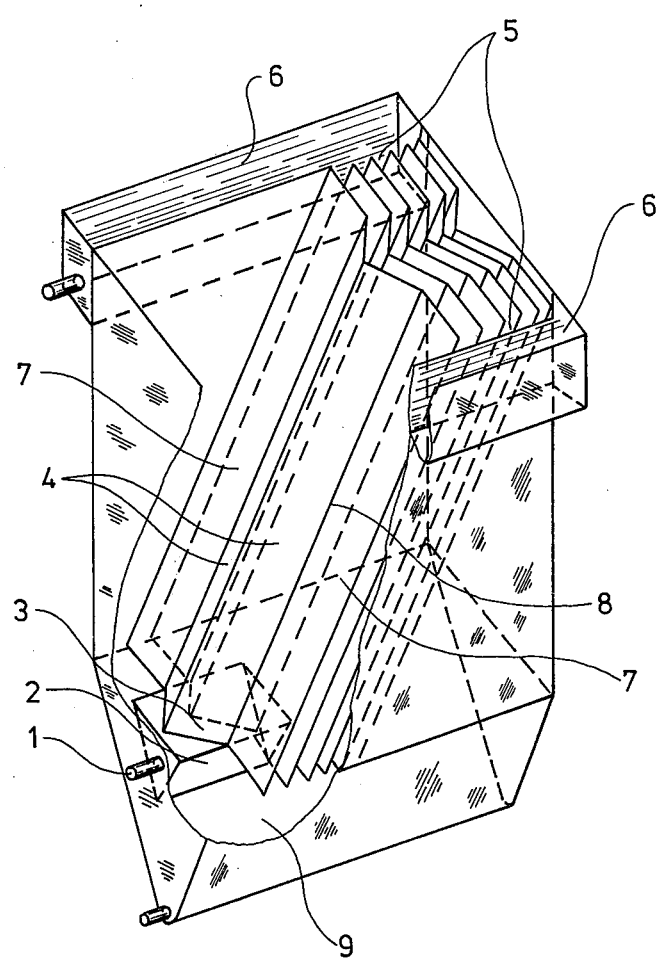
FIG. 1 shows a perspective view of a laminated settler according to one embodiment of the invention.
Figure 2:
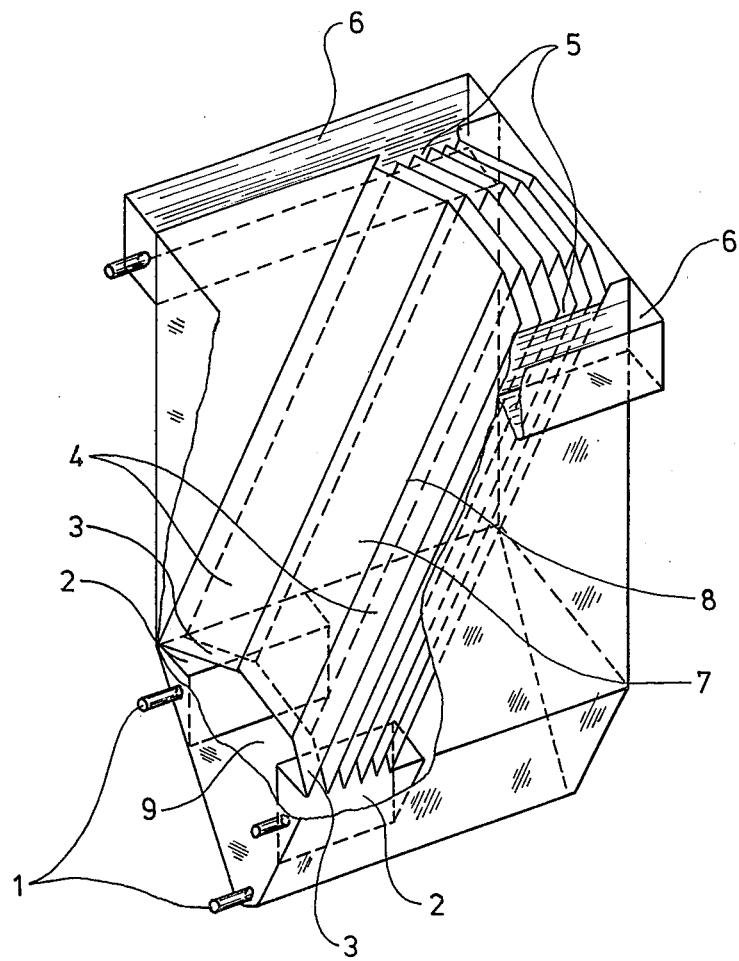
FIG. 2 shows also as a perspective view, a laminated settler according to another embodiment.

In a laminated settler according to FIG. 1, the liquid to be settled, e.g., waste water from a wood processing plant, is fed through a feeding groove 2 in the middle part of the laminae 3, and the liquid is fed into the groove through the pipe 1. The upper surface of the feeding groove is open between the laminae 3 and its upper edges are at the same level as the lower edges of the laminae 3. The liquid to be settled flows upwards along the compartments 5 formed between the slanted, parallel laminae 3 which are close to each other. Thus in a device according to the invention, the flow of the liquid fed need not suddenly change its direction, but its direction remains unchanged, whereby a laminar flow advantageous for sedimentation is rapidly achieved. In order that the flow into the compartments 5 between the laminae 3 be better distributed, the shape of the feeding groove 2 is such that its sides open towards the laminae at least in their upper parts. The triangular feeding groove 2 illustrated in FIGS. 1 and 2 is one example of such a groove shape. When the liquid fills the compartment 5 between two laminae, it is divided, under the effect of gravity, into two parts during the upward flow, namely, the treated liquid, which follows the lower surface of the uppermost of the two laminae, and the sediment, which separates from the liquid and settles on the upper surface of the lower lamina. The sediment flows along the slanting parts 4 of the laminae towards the unslanted side parts 7 of the laminae, which are separated from the slanted parts 4 by bends 8 which are parallel to the longitudinal direction of the laminae and are substantially of the same length as the lamina. From the unslanted side parts 7 the sediment flows into the sediment funnel beyond the feeding groove. The funnel also constitutes the floor of the laminated settler, and the sediment is removed from there. The treated liquid is removed as an overflow from the upper parts of the compartments 5 into the collecting troughs 6 on both sides of the laminae 3. FIG. 2 shows another embodiment of a laminated settler according to the invention, which has two feeding grooves 2 for the liquid to be settled. Thereby the liquid to be settled first arrives on the slanted side parts 4 of the laminae 3. When the liquid flows upwards, the sediment separating from the liquid flows from the slanted side parts 4 over the bends onto the unslanted middle parts 7, along which the sediment flows over the lower edges of the laminae 3 into the sediment funnel 9 below, which constitutes the tank floor of the laminated settler, and the sediment is removed from there. The treated liquid discharges as an overflow from the compartments 5 between the laminae into the collecting troughs 6 on the sides and is removed from there.

Figure 3:
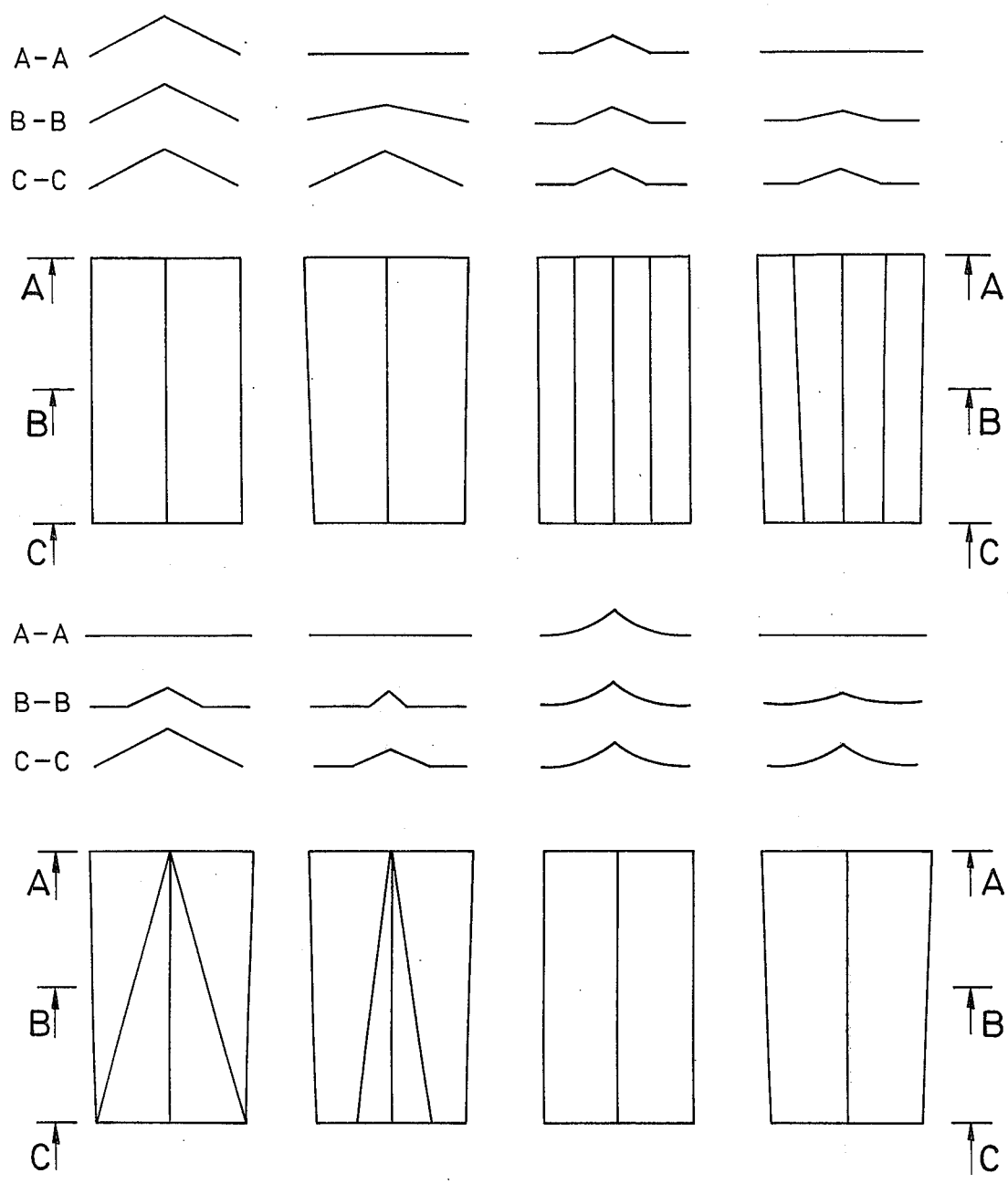
FIG. 3 shows both plan views and cross sections of lamina types used in the laminated settler according to FIG. 1.
Figure 4:
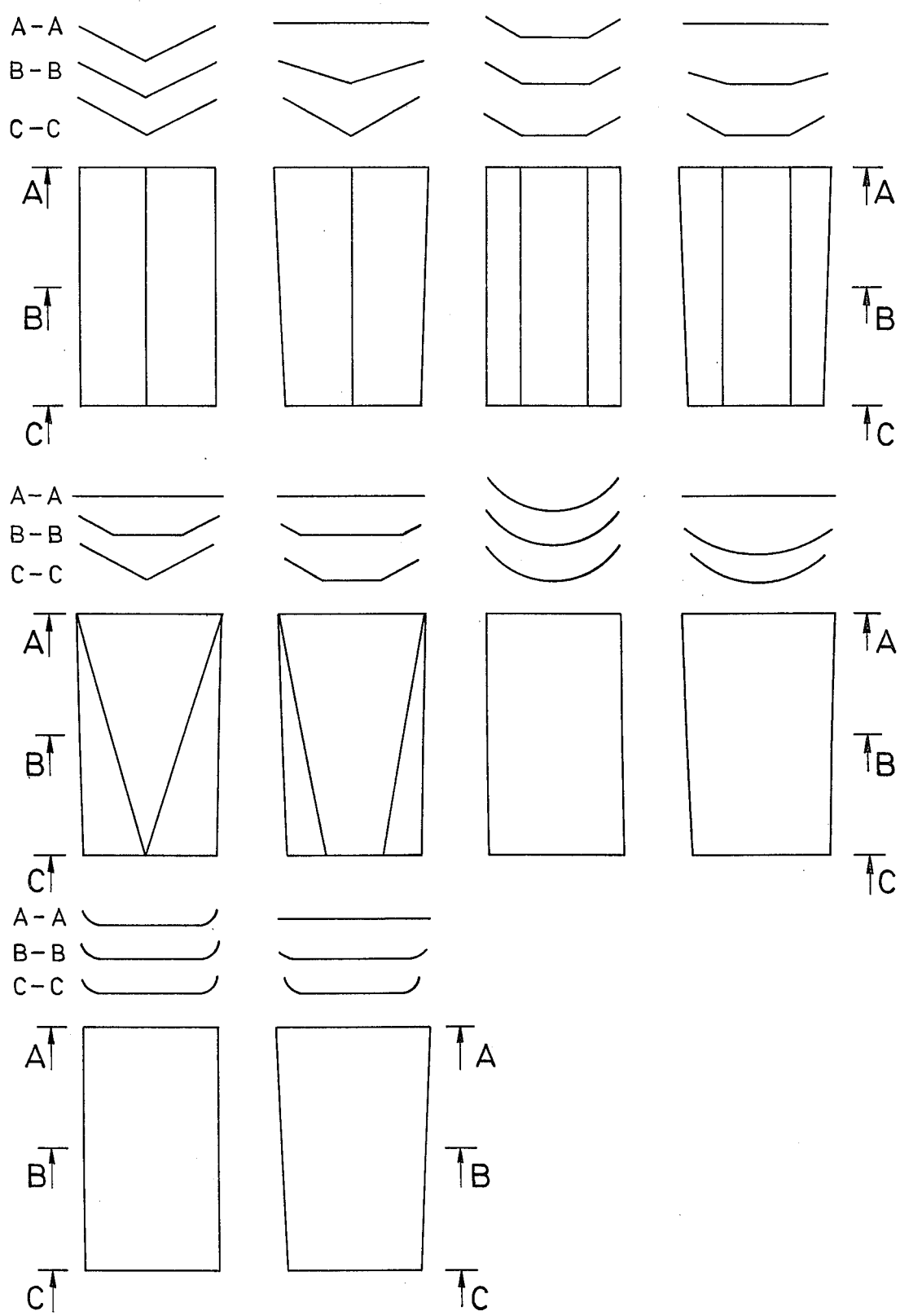
FIG. 4 shows both plan views and cross sections of lamina types used in the laminated settler according to FIG. 2.

FIG. 3 shows lamina shapes that can be used in a centrally fed laminated settler according to FIG. 1, and FIG. 4 shows laminae which are suitable for a laminated settler according to FIG. 2, wherein the liquid is fed from the sides of the laminae. Above each lamina type, the shape of the lamina is shown as cross sections of each end A—A and C—C and the middle B—B. A lamina according to FIG. 3 is characterized in that in its middle there is a ridge which is essentially of the same length as the lamina and slants towards the sides, extending beyond the feeding groove at the lower edge of the lamina. A lamina according to FIG. 4, again, is characterized in that on the sides it has parts which slant towards the center and which extends beyond the feeding grooves 2 at the lower edge of the lamina. In each case, the width of the feeding area is 20–80 percent of the lamina width.

What is claimed is:

1. A laminated settler for settling solids present in a liquid in a tank, into which the liquid to be settled is fed, said settler comprising
   a tank having upper and lower end portions,
   a plurality of laminae positioned in said tank in a slanted relation to the vertical and in spaced parallel relation to each other to define compartments therebetween in which the liquid to be settled flows,
   said laminae each having a flat surface portion and an inclined surface portion which extends angularly to the flat surface portion generally laterally of the direction of flow of liquid through said compartments;
   a feeding groove in the lower end portion of the tank open only to said compartments between the laminae at the laterally inclined surface portions thereof, said groove having an upper discharge edge located at the same level in the tank as the lower edge of the laminae and extending across only the surfaces laterally inclined surface portions of the laminae,
   said upper end portion of the tank having an outlet opening at substantially the same level as the upper ends of the laminae and collecting troughs at the upper end portion of the tank adjacent said outlet opening and the upper ends of the laminae for receiving liquid, from which the sediment has been removed, as an overflow through said outlet opening from the compartments between the laminae, and
   a sediment receiving chamber in the lower end portion of the bank for receiving sediment from the liquid, said sediment receiving chamber extending laterally further than said feeding groove,
   said tank having an inlet opening through which liquid is supplied to said groove and an outlet opening for removal of sediment from said receiving chamber,
   whereby particles settling out of liquid supplied from said groove to the compartments between the laminae are deflected by the inclined surface portions of the laminae towards the flat surface portions thereof to avoid conflict with first liquid supplied from the groove to said inclined surface portions of the laminae.

2. A device according to claim 1, wherein the inclined surface portions of the laminae are located in the middle portions of each laminae and the flat surface portions thereof are on both sides of the inclined surface portions of the laminae 3. A device according to claim 1, wherein the inclined surface portions of the laminae are located on both sides of each of the laminae and the flat surface portions are located in the middle of the laminae.

4. A device according to claim 1, wherein the width of the upper discharge end of the feeding groove opening to the laminae compartments at the inclined surface portions thereof is from 20 to 80 percent of the width of the laminae.

* * * * *